United States Patent
Zhu et al.

(10) Patent No.: US 8,594,566 B2
(45) Date of Patent: Nov. 26, 2013

(54) MOBILE WIRELESS COMMUNICATIONS DEVICE WITH NFC COUPLING CIRCUIT AND RELATED METHODS

(75) Inventors: Lizhong Zhu, Waterloo (CA); Libo Zhu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 166 days.

(21) Appl. No.: 13/344,917

(22) Filed: Jan. 6, 2012

(65) Prior Publication Data
US 2013/0178154 A1 Jul. 11, 2013

(51) Int. Cl.
*H04B 5/00* (2006.01)

(52) U.S. Cl.
USPC ........................................ 455/41.1

(58) Field of Classification Search
USPC ................... 455/41.1, 41.2, 41.3
See application file for complete search history.

(56) References Cited

U.S. PATENT DOCUMENTS

| | | | |
|---|---|---|---|
| 7,689,195 B2 | 3/2010 | Wu et al. | 455/336 |
| 7,890,080 B2 | 2/2011 | Wu et al. | 455/336 |
| 7,949,309 B2 | 5/2011 | Rofougaran et al. | 455/77 |
| 2008/0242237 A1 | 10/2008 | Rofougaran et al. | 455/77 |
| 2008/0242240 A1 | 10/2008 | Rofougaran et al. | 455/86 |
| 2010/0148723 A1 | 6/2010 | Cook et al. | 320/108 |
| 2011/0238518 A1 | 9/2011 | Florek | |
| 2012/0083205 A1* | 4/2012 | Marcu et al. | 455/41.1 |
| 2013/0078914 A1* | 3/2013 | Royston et al. | 455/41.1 |

FOREIGN PATENT DOCUMENTS

| | | | |
|---|---|---|---|
| EP | 2393215 | 12/2011 | |
| WO | 2008117029 | 10/2008 | |
| WO | WO 2011/140458 | 11/2011 | G06K 5/00 |

* cited by examiner

*Primary Examiner* — Nay A Maung
*Assistant Examiner* — Maryam Soltanzadeh
(74) *Attorney, Agent, or Firm* — Allen, Dyer, Doppelt, Milbrath & Gilchrist, P.A.

(57) ABSTRACT

A mobile wireless communications device may include a housing, a wireless transceiver carried by the housing, a processor carried by the housing and coupled to the wireless transceiver, and an NFC IC carried by the housing and coupled to the processor. The mobile wireless communications device may also include an NFC antenna carried by the housing, and a coupling circuit between the NFC IC and the NFC antenna. The coupling circuit may include a capacitive network including capacitors coupled in series with each other and in parallel with the NFC antenna, a transmit branch coupled between the NFC IC and a first node between a first pair of capacitors, and a receive branch coupled between the NFC IC and the first node between the first pair of capacitors.

22 Claims, 4 Drawing Sheets

US 8,594,566 B2

MOBILE WIRELESS COMMUNICATIONS DEVICE WITH NFC COUPLING CIRCUIT AND RELATED METHODS

TECHNICAL FIELD

This application relates to the field of communications, and more particularly, to near field communication devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters. Typical NFC chips operate in one of three modes: an integrated circuit (IC) card emulation mode (NFC device appears to an external reader as a traditional contactless smart card); a reader/writer mode (NFC device reads NFC tags); and a peer-to-peer mode (two NFC devices exchanging data).

Referring to FIG. 1, a typical NFC device 10 includes an NFC IC chip 11, an NFC antenna 12, and a coupling circuit 13 coupled between the NFC IC chip and the NFC antenna. The NFC antenna 12 is modeled to include a resistor 71 ($R_S$), an inductor 72 ($L_S$) coupled in series thereto, and a capacitor 73 ($C_A$) coupled in parallel to the resistor and the inductor. The coupling circuit 13 illustratively includes a tuning circuit comprising a first capacitor 61 ($C_{AC2}$), a second capacitor 62 ($C_{AC1}$) coupled in parallel to the first capacitor, and a diode 63 ($D_{AC1}$) coupled in series to the second capacitor. The coupling circuit also includes a receive branch including a resistor 65 ($R_R$), and a capacitor 66 ($C_R$) coupled in series thereto, and an antenna branch including an inductor 67 ($L_E$), and a pair of capacitors 68-69 ($C_{E,C}$) coupled thereto. Drawbacks to this NFC device 10 may include heavy loading of the external circuit to the NFC resonating tank, thereby reducing the Q factor of the NFC antenna 12. Moreover, the different operating modes of the NFC IC chip 11 may not be optimized, and it may be difficult to match and tune each coupling branch without unintentional cascaded effects.

DETAILED DESCRIPTION

Figure 1:
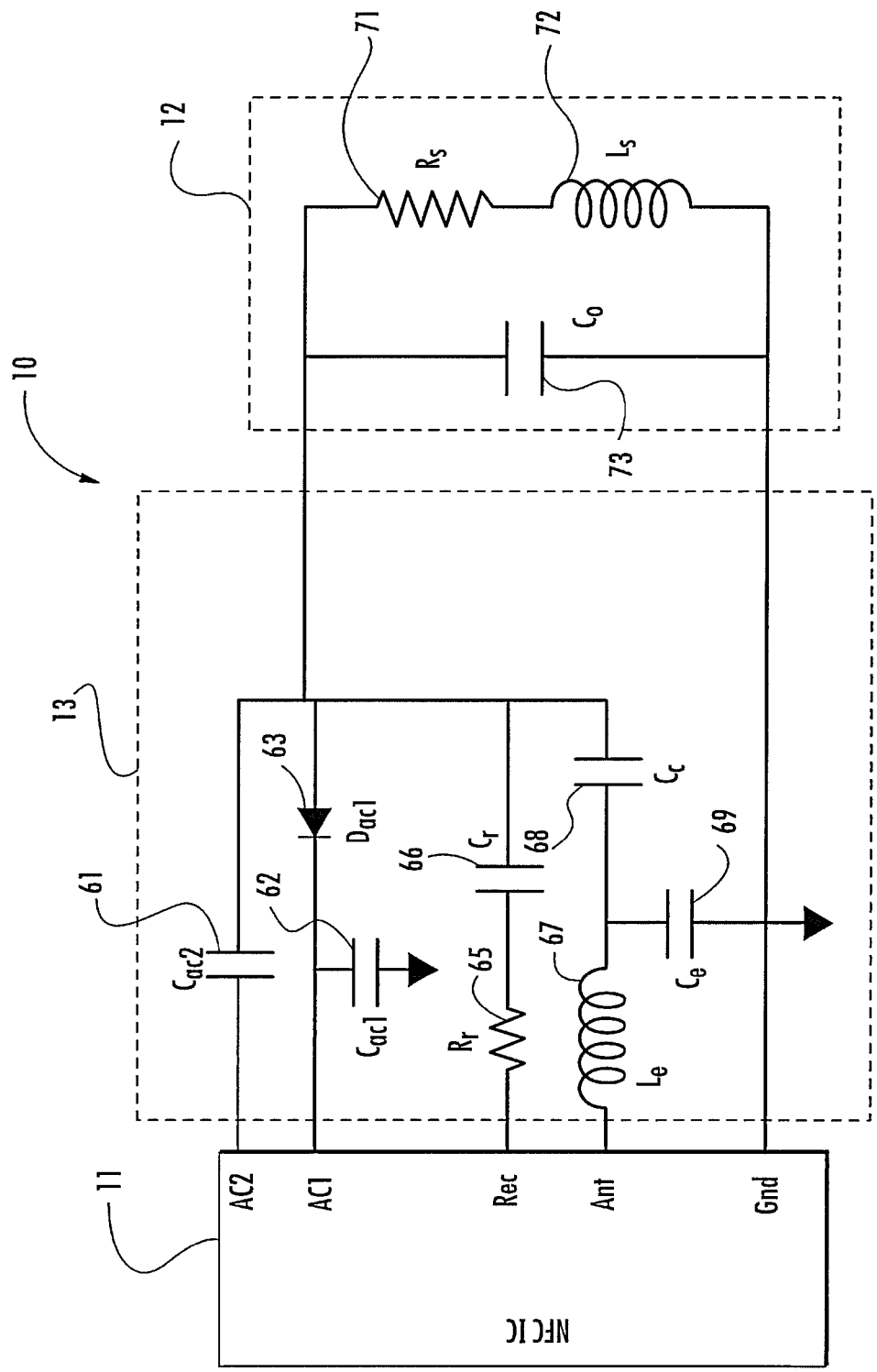
FIG. 1 is a schematic circuit diagram of a portion of a mobile wireless communications device, according to the prior art.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 0-40 cm, but other suitable versions of near-field communication which may have different operating frequencies, effective ranges, etc., for example, may also be used.

Generally speaking, a mobile wireless communications device may include a housing, a wireless transceiver carried by the housing, and a processor carried by the housing and coupled to the wireless transceiver. The mobile wireless communications device may also include an NFC IC carried by the housing and coupled to the processor, an NFC antenna carried by the housing, and a coupling circuit between the NFC IC and the NFC antenna. The coupling circuit may include a capacitive network comprising a plurality of capacitors coupled in series with each other and in parallel with the NFC antenna, a transmit branch coupled between the NFC IC and a first node between a first pair of capacitors of the plurality thereof, and a receive branch coupled between the NFC IC and the first node between the first pair of capacitors of the plurality thereof.

The coupling circuit may further comprise at least one tuning branch coupled between the NFC IC and a second node between a second pair of capacitors of the plurality thereof. In some embodiments, the at least one tuning branch may comprise a pair thereof.

More specifically, the pair of tuning branches may comprise a first tuning branch comprising a first capacitor, and a second tuning branch comprising a second capacitor, and a diode coupled thereto. The NFC transmit branch may comprise an inductor and a capacitor coupled thereto. The NFC transmit branch may further comprise another capacitor coupled at a node between the inductor and the capacitor and a voltage reference.

The NFC receive branch may comprise a resistor and a capacitor coupled thereto. The NFC IC may be configured to cooperate with the processor to operate in an IC card emulation mode or a reader/writer mode. For example, the wireless transceiver may comprise a cellular transceiver.

Another aspect is directed to a method for making a mobile wireless communications device comprising a wireless transceiver, a processor coupled to the wireless transceiver, an NFC IC, and an NFC antenna. The method may comprise coupling a coupling circuit between the NFC IC and the NFC antenna. The coupling circuit may include a capacitive network comprising a plurality of capacitors coupled in series with each other and in parallel with the NFC antenna, a transmit branch coupled between the NFC IC and a first node between a first pair of capacitors of the plurality thereof, and a receive branch coupled between the NFC IC and the first node between the first pair of capacitors of the plurality thereof.

Figure 2:
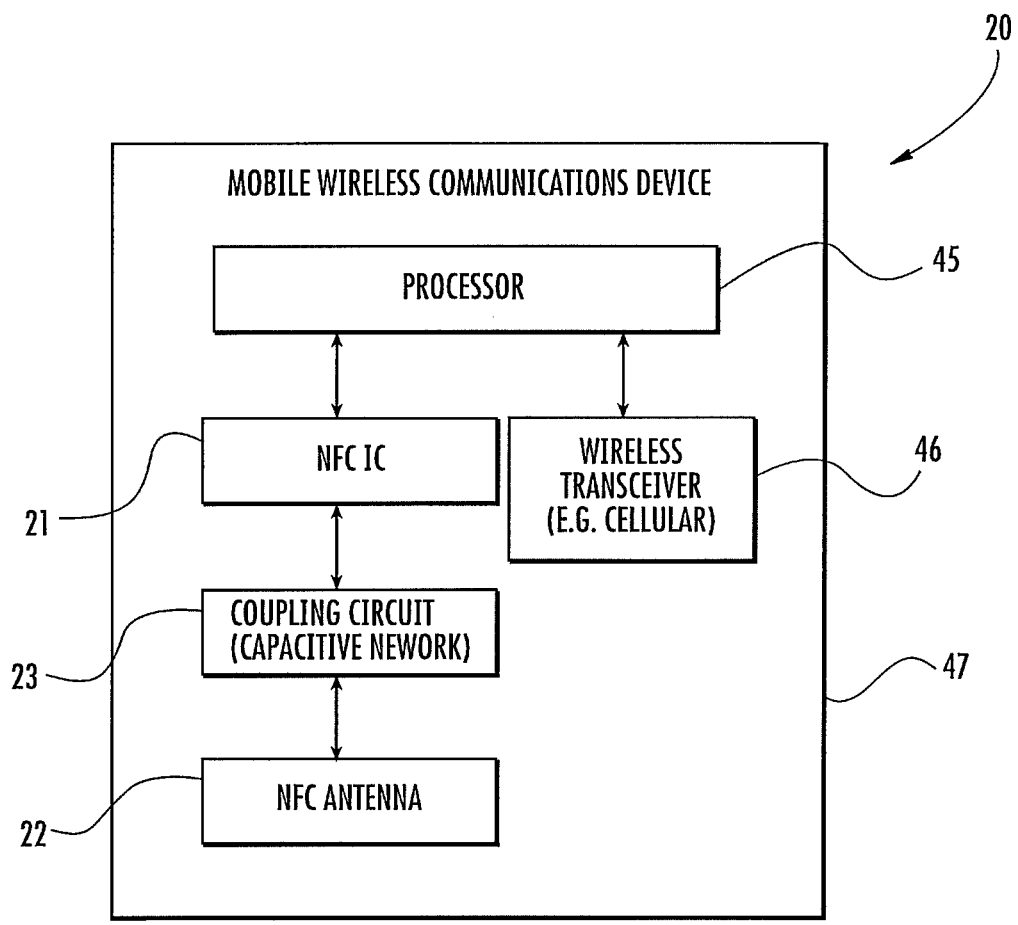
FIG. 2 is a schematic circuit diagram of an example embodiment of a mobile wireless communications device, according to the present disclosure.

Referring now to FIG. 2, a mobile wireless communications device 20 according to the present disclosure is now described. The mobile wireless communications device 20 illustratively includes a housing 47, a wireless transceiver 46 carried by the housing, and a processor 45 carried by the housing and coupled to the wireless transceiver (e.g. cellular transceiver). The mobile wireless communications device 20 illustratively includes an NFC IC 21 carried by the housing 47 and coupled to the processor 45, an NFC antenna 22 carried by the housing, and a coupling circuit 23 between the NFC IC and the NFC antenna.

Figure 3:
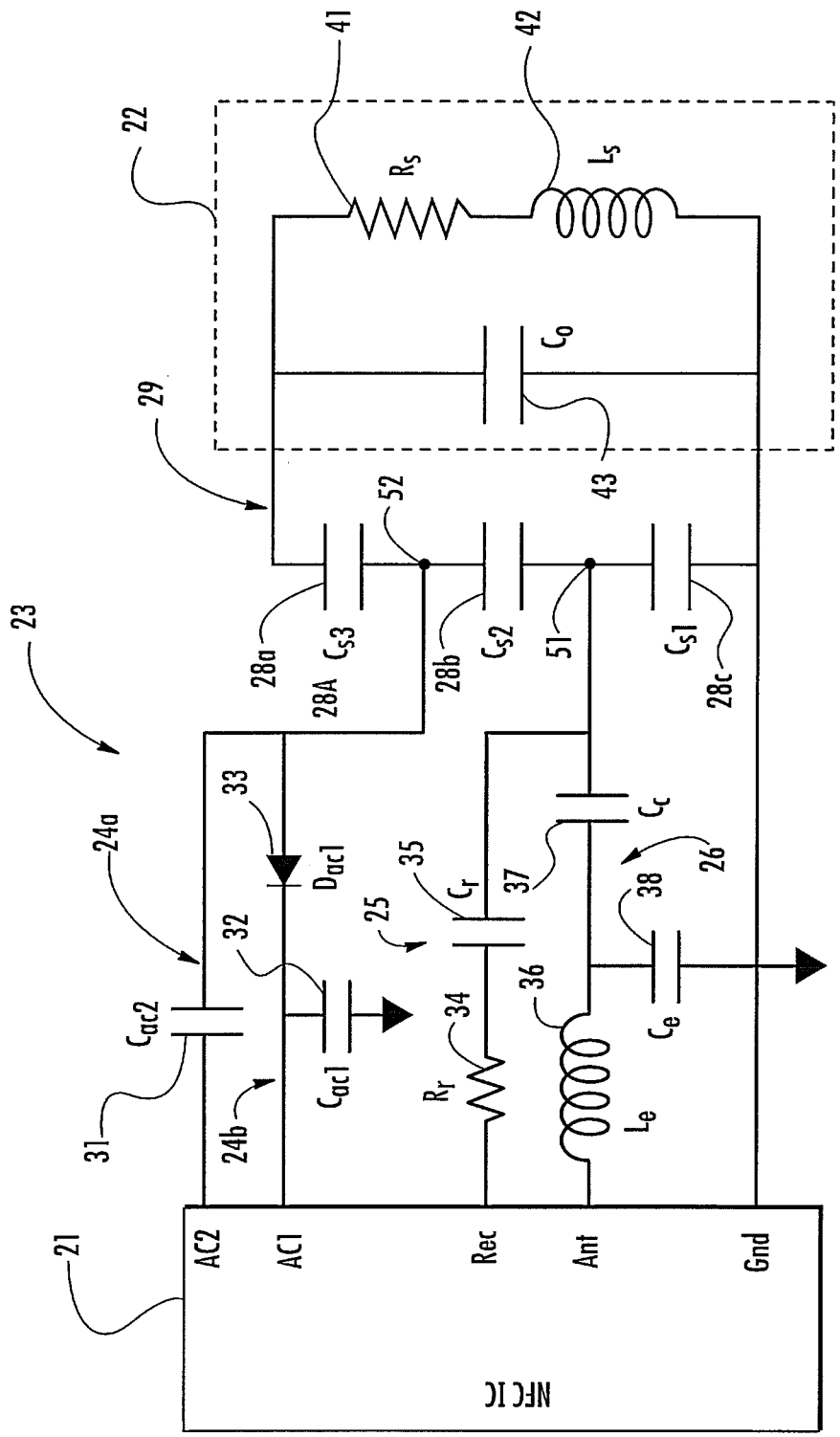
FIG. 3 is a schematic circuit diagram of a portion of the mobile wireless communications device of FIG. 2.
Figure 4:
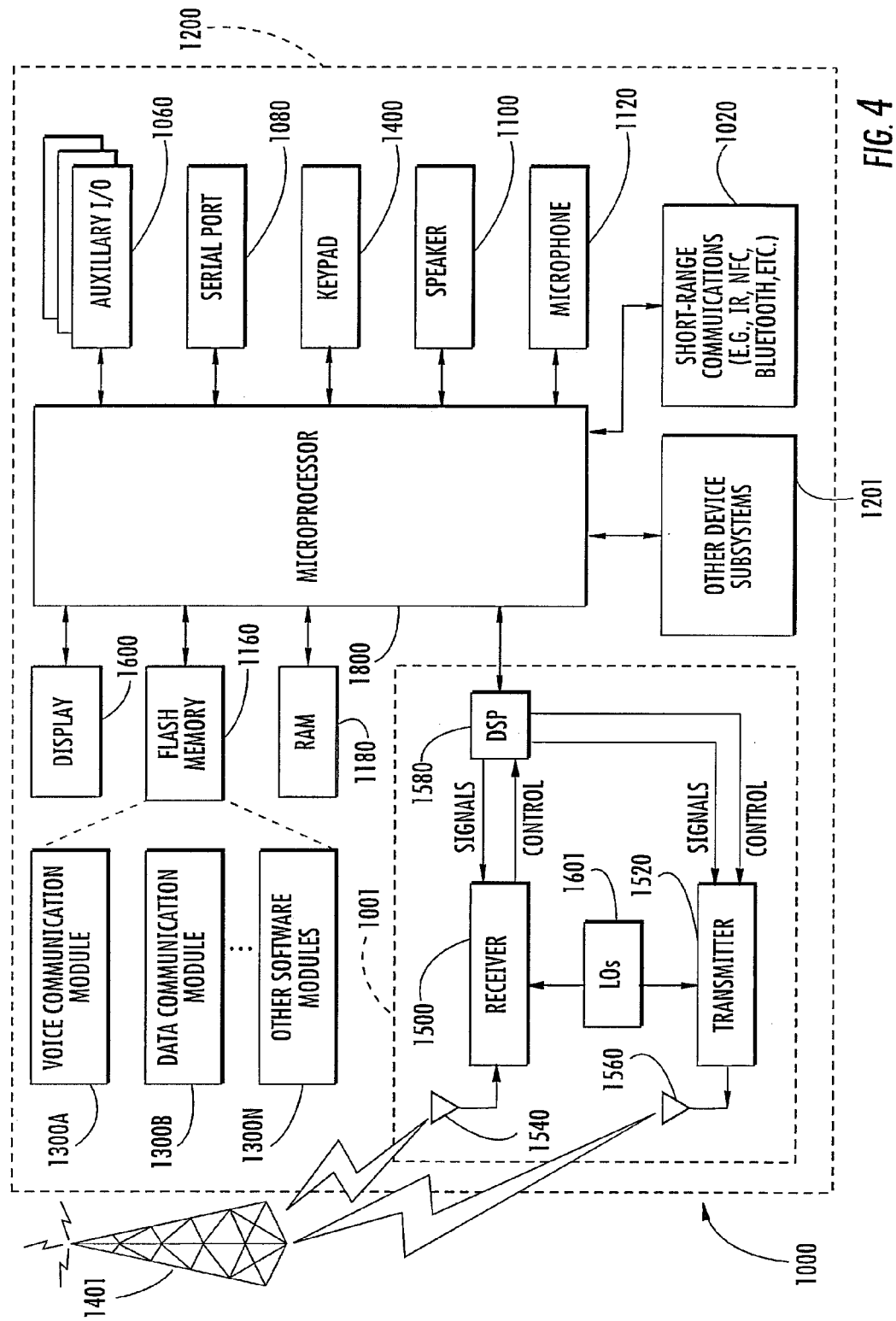
FIG. 4 is a schematic block diagram illustrating example components of a mobile wireless communications device that may be used with the mobile wireless communications device of FIG. 2.

Referring now additionally to FIG. 3, the NFC IC 21 comprises a plurality of terminals including a reference voltage terminal (e.g. ground voltage terminal), an antenna terminal, a receive terminal, and first and second AC charge terminals. The NFC IC 21 may be configured to cooperate with the processor 45 to operate in an IC card emulation mode (NFC device appears to an external reader as a traditional contactless smart card), a reader/writer mode (NFC device reads NFC tags), and a peer-to-peer mode (two NFC devices exchanging data).

The coupling circuit 23 illustratively includes a capacitive network 29 comprising a plurality of capacitors 28a-28c ($C_{S1\text{-}S3}$) (illustratively three) coupled in series with each other and in parallel with the NFC antenna 22, a transmit branch 26 coupled between the NFC IC 21 and a first node 43 between a first pair of capacitors 28b-28c, and a receive branch 25 coupled between the NFC IC and the first node. In other embodiments, the plurality of capacitors may comprise four or more series coupled capacitors.

The coupling circuit 23 illustratively includes first and second tuning branches 24a-24b coupled between the NFC IC 21 and a second node 52 between a second pair of capacitors 28a-28b. In other embodiments, the tuning branches 24a-24b may be reduced to a single tuning branch.

More specifically, the first tuning branch 24a comprises a first capacitor 31 ($C_{AC2}$), and is coupled to the second AC charge terminal of the NFC IC 21. During operation, the second AC charge terminal of the NFC IC 21 generates a voltage to charge this first capacitor 31. The second tuning branch 24b illustratively includes a second capacitor 32 ($C_{AC1}$), and a diode 33 ($D_{AC1}$) coupled in series with the diode, and is coupled to the first AC charge terminal of the NFC IC 21. The first AC charge terminal also provides a voltage for charging the second capacitor 32. The NFC transmit branch 26 illustratively includes an inductor 36 ($L_E$), a capacitor 37 ($C_C$) coupled in series with the inductor, and another capacitor 38 ($C_E$) coupled at a node between the inductor and the capacitor and a voltage reference (illustrated as ground voltage). The NFC receive branch 25 illustratively includes a resistor 34 ($R_R$), and a capacitor 35 ($C_R$) coupled in series thereto.

As will be appreciated by those skilled in the art, the NFC antenna 22 may be modeled as a plurality of electrical components. In the illustrated embodiment, the NFC antenna 22 is modeled to illustratively include a resistor 41 ($R_S$), an inductor 42 ($L_S$) coupled in series with the resistor, and a capacitor 43 ($C_O$) coupled in parallel with the resistor and the inductor.

In the typical coupling circuit (FIG. 1), the reader/writer mode links of the antenna and receiver terminals of the NFC IC 11 and the IC card emulation mode links of the first and second AC charge terminals of the NFC IC are directly coupled to the NFC antenna 12. Advantageously, in the example embodiment disclosed herein, the capacitive network 29 of the coupling circuit 23 is configured to isolate the IC card emulation mode and the reader/writer mode of the NFC IC 21. The capacitive network 29 is configured to partially capacitively couple the NFC antenna 22 to the NFC transmit and receive branches 25-26. The coupling circuit 23 may provide for increased Q (quality) factor for the NFC antenna 22 due to the partial NFC circuit couplings. Moreover, by adjusting the capacitance vales of the capacitors 28a-28c of the capacitive network 29, the reader/writer and IC card emulation modes may be balanced and optimized.

Another aspect is directed to a method for making a mobile wireless communications device 20 comprising a wireless transceiver 46, a processor 45 coupled to the wireless transceiver, an NFC IC 21, and an NFC antenna 22. The method may comprise coupling a coupling circuit 23 between the NFC IC 21 and the NFC antenna 22. The coupling circuit 23 may include a capacitive network 29 comprising a plurality of capacitors 28a-28c coupled in series with each other and in parallel with the NFC antenna 22, a transmit branch 26 coupled between the NFC IC 21 and a first node 51 between a first pair of capacitors 28b-28c of the plurality thereof, and a receive branch 25 coupled between the NFC IC and the first node between the first pair of capacitors 28a-28b of the plurality thereof.

Example components of a mobile wireless communications device 1000 that may be used in accordance with the above-described embodiments are further described below with reference to FIG. 3. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 3. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or an NFC sensor for communicating with an NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a housing;
a wireless transceiver carried by said housing;
a processor carried by said housing and coupled to said wireless transceiver;
a near field communication (NFC) integrated circuit (IC) carried by said housing and coupled to said processor;

an NFC antenna carried by said housing; and
a coupling circuit between said NFC IC and said NFC antenna comprising
a capacitive network comprising a plurality of capacitors coupled in series with each other and in parallel with said NFC antenna,
a transmit branch coupled between said NFC IC and a first node between a first pair of capacitors of said plurality thereof, and
a receive branch coupled between said NFC IC and the first node between the first pair of capacitors of said plurality thereof.

2. The mobile wireless communications device of claim 1 wherein said coupling circuit further comprises at least one tuning branch coupled between said NFC IC and a second node between a second pair of capacitors of said plurality thereof.

3. The mobile wireless communications device of claim 2 wherein said at least one tuning branch comprises a pair thereof.

4. The mobile wireless communications device of claim 3 wherein said pair of tuning branches comprises a first tuning branch comprising a first capacitor, and a second tuning branch comprising a second capacitor, and a diode coupled thereto.

5. The mobile wireless communications device of claim 1 wherein said NFC transmit branch comprises an inductor and a capacitor coupled thereto.

6. The mobile wireless communications device of claim 5 wherein said NFC transmit branch further comprises another capacitor coupled at a node between said inductor and said capacitor and a voltage reference.

7. The mobile wireless communications device of claim 1 wherein said NFC receive branch comprises a resistor and a capacitor coupled thereto.

8. The mobile wireless communications device of claim 1 wherein said NFC IC is configured to cooperate with said processor to operate in an IC card emulation mode or a reader/writer mode.

9. The mobile wireless communications device of claim 1 wherein said wireless transceiver comprises a cellular transceiver.

10. A mobile wireless communications device comprising:
a housing;
a wireless transceiver carried by said housing;
a processor carried by said housing and coupled to said wireless transceiver;
a near field communication (NFC) integrated circuit (IC) carried by said housing and coupled to said processor, said NFC IC configured to cooperate with said processor for operation in an IC card emulation mode or a reader/writer mode;
an NFC antenna carried by said housing; and
a coupling circuit between said NFC IC and said NFC antenna comprising
a capacitive network comprising a plurality of capacitors coupled in series with each other and in parallel with said NFC antenna,
a transmit branch coupled between said NFC IC and a first node between a first pair of capacitors of said plurality thereof,
a receive branch coupled between said NFC IC and the first node between the first pair of capacitors of said plurality thereof, and
at least one tuning branch coupled between said NFC IC and a second node between a second pair of capacitors of said plurality thereof.

11. The mobile wireless communications device of claim 10 wherein said at least one tuning branch comprises a pair thereof.

12. The mobile wireless communications device of claim 11 wherein said pair of tuning branches comprises a first tuning branch comprising a first capacitor, and a second tuning branch comprising a second capacitor, and a diode coupled thereto.

13. The mobile wireless communications device of claim 10 wherein said NFC transmit branch comprises an inductor and a capacitor coupled thereto.

14. The mobile wireless communications device of claim 13 wherein said NFC transmit branch further comprises another capacitor coupled at a node between said inductor and said capacitor and a voltage reference.

15. The mobile wireless communications device of claim 10 wherein said NFC receive branch comprises a resistor and a capacitor coupled thereto.

16. The mobile wireless communications device of claim 10 wherein said wireless transceiver comprises a cellular transceiver.

17. A method for making a mobile wireless communications device comprising a wireless transceiver, a processor coupled to the wireless transceiver, a near field communication (NFC) integrated circuit (IC), and an NFC antenna, the method comprising:
coupling a coupling circuit between the NFC IC and the NFC antenna, the coupling circuit comprising
a capacitive network comprising a plurality of capacitors coupled in series with each other and in parallel with the NFC antenna,
a transmit branch coupled between the NFC IC and a first node between a first pair of capacitors of the plurality thereof, and
a receive branch coupled between the NFC IC and the first node between the first pair of capacitors of the plurality thereof.

18. The method of claim 17 wherein the coupling circuit further comprises at least one tuning branch coupled between the NFC IC and a second node between a second pair of capacitors of the plurality thereof.

19. The method of claim 18 wherein the at least one tuning branch comprises a pair thereof.

20. The method of claim 19 wherein the pair of tuning branches comprises a first tuning branch comprising a first capacitor, and a second tuning branch comprising a second capacitor, and a diode coupled thereto.

21. The method of claim 17 wherein the NFC transmit branch comprises an inductor and a capacitor coupled thereto.

22. The method of claim 21 wherein the NFC transmit branch further comprises another capacitor coupled at a node between the inductor and the capacitor and a voltage reference.

* * * * *